United States Patent Office 3,776,979
Patented Dec. 4, 1973

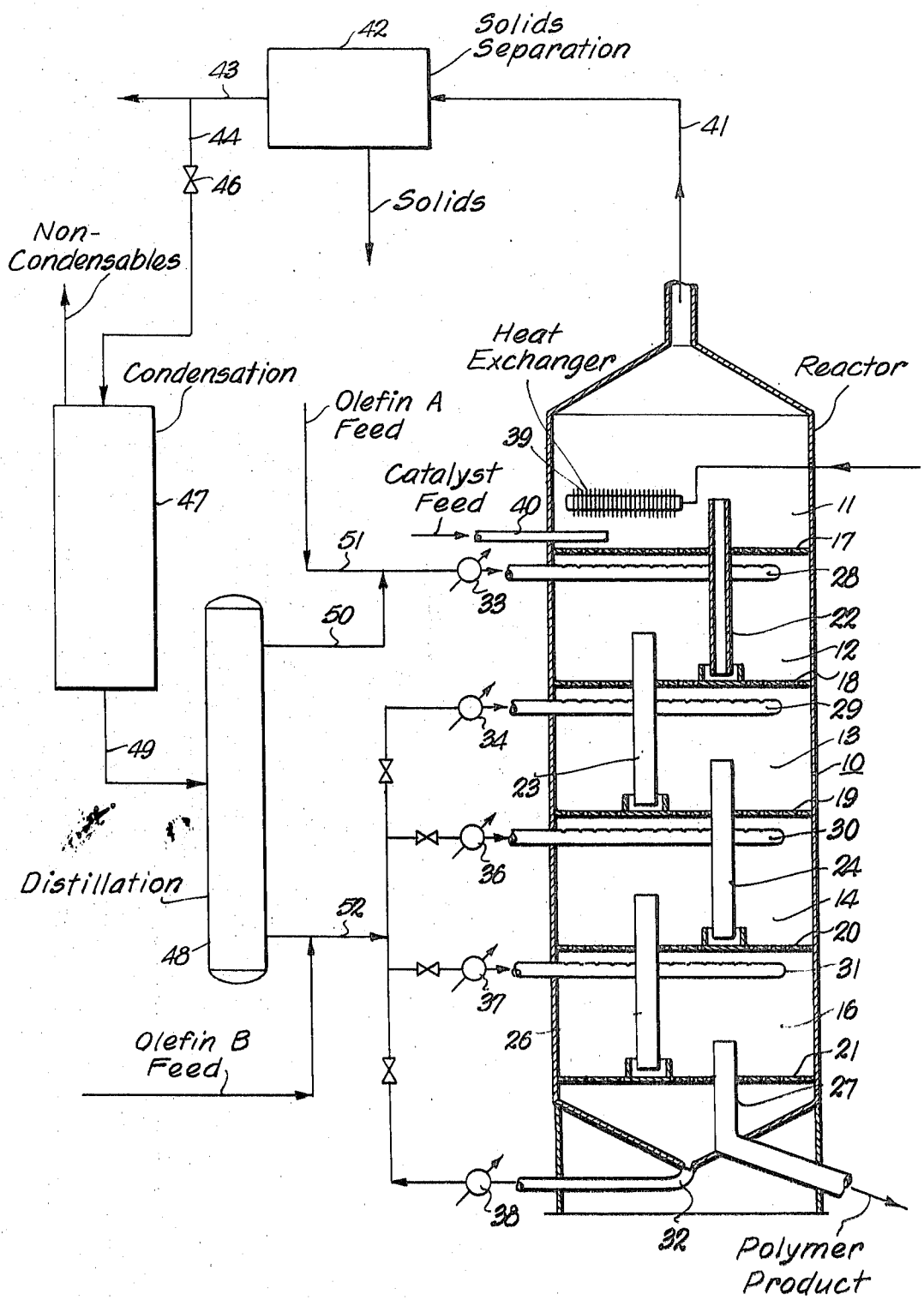

3,776,979
OLEFIN BLOCK COPOLYMER FLUIDIZED-BED POLYMERIZATION PROCESS
Robert William Hill, Leawood, Kans., assignor to Gulf Research & Development Company, Pittsburgh, Pa.
Filed Nov. 5, 1971, Ser. No. 196,001
Int. Cl. C08f 15/00
U.S. Cl. 260—878 B                                9 Claims

ABSTRACT OF THE DISCLOSURE

Olefin block copolymers are prepared by a fluidized-bed polymerization process wherein a vaporous feed is passed upwardly through multiple reaction zones in intimate contact with downwardly flowing fluidized catalyst and polymer particles, olefin A being continuously introduced into an upper polymerization zone, olefin B being continuously introduced into a lower polymerization zone, and a A–B block copolymer product being continuously withdrawn from the lowest polymerization zone.

BACKGROUND OF THE INVENTION

Conventionally certain olefins such as ethylene, propylene, and 1-butene are polymerized in the vaporous phase employing various solid form catalysts. One method which has been investigated comprises employing finely divided solid catalysts in a dense bed of fluidized solids in a state of hindered settling that includes passing a gas containing the olefin to be polymerized through the bed. Under these conditions, the gases agitate the solids and thus keep them in a state of turbulent motion which promotes intimate contact to the olefin with the solid particles containing catalyst. As polymerization is effected on the catalyst surface, the solid particles within the polymerization reactor comprise catalyst particles containing solid olefin polymer.

In a fluidized-bed polymerization system, it is known to employ multiple polymerization zones to obtain maximum catalyst deficiency. The counterflow of feed gases and catalyst-containing particles within a single bed result in rapid random mixing of the solids, a characteristic of a dense fluidized bed, and results in a significant reduction of catalyst deficiency.

Although fluidized-bed systems have been employed in the homopolymerization of olefins, such systems have not heretofore been employed in the polymerization of, for example, ethylene and propylene to form ethylene-propylene block copolymers. The lower reactivity of propylene compared with ethylene resulting in substantially slower polymerization rates for propylene, normally requires that the preparation of such block copolymers be produced in separate reactors wherein ethylene and propylene polymerization conditions can be independently closely controlled.

Accordingly, an object of the invention is to provide an improved process for the vapor phase polymerization of olefins to obtain ethylene-propylene block copolymers.

Another object of the invention is to obtain olefin block copolymers employing a single reaction vessel.

Yet another object of the invention is to provide an improved fluidized-bed olefin polymerization system for the preparation of olefin block copolymers.

Other objects, advantages and features of the invention will be readily apparent to those skilled in the art from the following description, the drawing and appended claims.

SUMMARY OF THE INVENTION

Olefin block copolymers are prepared by a fluidized-bed polymerization process wherein a vaporous olefin feed is passed upwardly through multiple reaction zones in intimate contact with downwardly flowing fluidized catalyst and polymer particles, olefin A being continuously introduced into an upper polymerization zone, olefin B being continuously introduced into a lower polymerization zone, and an A–B block copolymer product being continuously withdrawn from the lowest polymerization zone with significantly different polymerization conditions being maintained in at least one of the multiple reaction zones. If the olefin monomers employed to prepare the block copolymers have different reactivities, the more reactive olefin is introduced into the upper polymerization zone and the less reactive olefin is introduced into a lower polymerization zone.

DESCRIPTION OF THE DRAWING

The drawing is a diagrammatic representation of a vertical, five-zone fluidized-bed reactor employed in a vapor phase olefin polymerization process to produce block copolymers.

DESCRIPTION OF THE INVENTION

The invention is applicable to the vapor phase polymerization of ethylene, propylene, butene-1, butadiene, pentene-1 and 3-methylbutene to obtain block copolymers of such olefins. It is to be understood that the term "copolymer" as employed in this application refers to the polymerization of two or more of the named olefins to obtain block olefin polymers. The invention is particularly applicable in the preparation of ethylene-propylene block copolymers.

The catalyst employed in the vapor phase polymerization of the above-named olefins comprises conventional solid finely divided catalyst compositions that catalyze the polymerization of the olefins to solid polymers. These catalyst compositions include catalysts comprising chromium oxide, a substantial portion of the chromium oxide being in the hexavalent state, associated with at least one other porous solid, normally an oxide selected from the group consisting of silica, aluminum, zirconium and thoria. Catalysts of this description are described in U.S. Pat. 2,825,721, issued Mar. 4, 1958. Finely divided Ziegler-type catalyst compositions such as described in U.S. 3,219,648 can also be employed in the vapor phase polymerization of olefins to produce block copolymers. Reference is made to the above-named patents for a description of methods of preparing their respective catalyst compositions which can suitably be employed in the novel block copolymerization process.

Referring to the drawing, a reactor 10 contains five fluidized-bed polymerization zones 11, 12, 13, 14 and 16. As shown, each of the fluidized beds are positioned above perforated plates 17, 18, 19, 20 and 21, respectively. Adjustable standpipe members 22, 23, 24 and 26 are positioned so as to permit the passage of catalyst and polymer particles from an upper fluidized-bed zone to the next adjacent lower fluidized bed. An adjustable standpipe 27 is positioned so as to permit the continuous withdrawal of the block copolymer product.

Vaporous olefin feed is introduced into reactor 10 and to fluidized-bed zones 11, 12, 13, 14 and 16 via vaporous distribution headers 28, 29, 30, 31 and 32, respectively. As shown, temperature control in each of the fluidized zones can be effected by heating or cooling each of the olefin feed streams by heat exchange means 33, 34, 36, 37 and 38, respectively. Additionally, temperature control in the upper fluidized bed can be controlled by a heat exchange means 39. Additional heat exchange means can also be positioned in each of the lower fluidized-bed zones, if desired.

Finely divided catalyst compositions are passed into the upper zone (zone 11) of reactor 10 via conduit means 40. It is necessary that the catalyst employed have active sites of relatively long life so that the same sites may remain active throughout the particle residence time in the reactor. Although not to be limited thereto, catalysts of the Ziegler type are preferred. Ziegler-type catalyst compositions found to be effective in the practice of the invention are those formed by combining an organometallic compound of a metal of Groups II–A, II–B and III–A of the Periodic Table with a halide of a metal of Groups IV–B, V–B or VI–B of the Periodic Table. These catalyst compositions are conveniently produced by reacting the organometallic compound with a metal halide in the presence of a hydrocarbon solvent such isooctane, n-heptane, xylene or benzene. The molar ratio between the organometallic compound and the halogenated metal can be varied within wide limits. A ratio of about 0.25 to about 4 mols of halogenated compound, such as a titanium or vanadium trichloride, to 1 mol of the organometallic compound is suitable. As described in U.S. 3,219,648, such catalyst compositions can also contain an additive compound selected from the group consisting of those polyamines, polyethers, aminoethers, aminoalcohols and hydroxyethers which normally chelate metals. In addition to the named constituents, the catalyst compositions employed in the process of this invention can also include a carrier.

A vaporous stream containing finely divided solids entrained therein is withdrawn from the top of reactor 10 via conduit 41 and passed to a solids separation zone 42. Solids separation zone 42 can comprise a conventional means for separating finely divided solids from a vaporous stream such as a cyclone separator. A vaporous stream, substantially free of solids, is withdrawn from solids separation zone 42 via conduit 43.

It is within the scope of the invention to recycle at least a portion of the unreacted vaporous olefin contained in the gaseous stream withdrawn from the top of reactor 10. In recycling the vaporous olefin to reactor 10, the recycle stream is passed to a condensation zone 47. Condensation zone 47 can comprise a condenser and compression stages whereby the olefin stream is condensed and separated from noncondensable gaseous constituents such as nitrogen. The condensed olefin recycle stream can be passed from condensation zone 47 to a distillation column 48 via conduit 49.

Within distillation column 48, the olefin feed stream can be fractionated to provide an olefin A fraction which is recycled to reactor 10 via conduits 50 and 51 and an olefin B fraction which is recycled to reactor 10 via conduit 52. As shown in the drawing, the recycle streams are combined with the olefin feed streams passed to reactor 10. It is also within the scope of this invention to independently introduce the raw olefin feed streams into reactor 10.

The residence time for the catalyst and polymer particles in each of the fluidized zones can be adjusted by raising and lowering standpipe members 22, 23, 24, 26 and 27. For example, if it were desired to produce a block copolymer containing 10 percent of olefin A and 90 percent of olefin B, the height of standpipes 23, 24, 26 and 27, and therefore the bed depth, could be positioned so as to be twice that of standpipe 22, thereby producing the 10–90 block copolymer.

Although the drawing illustrates a five-stage fluidized polymerization process, it is, of course, within the scope of the invention to employ less than five stages or more than five stages. For example, if it is desired to obtain a block copolymer employing two olefin monomers of equal reactivity wherein the block copolymer shall contain 10 percent of olefin A, a ten-stage fluidized reactor could be employed. In this instance, olefin A would be passed directly to the top fluidized-bed zone and olefin B would be passed directly to the remainder of the lower stages through the gas inlet distributing heads. It can be seen from this illustration and the illustration described in the above paragraph that the concentration of the olefin monomers in the product block copolymer can be adjusted by increasing or decreasing the number of fluidized beds and by adjusting the height of the individual standpipe members so as to increase or decrease polymer particle residence time in each of the zones.

As shown in the drawing, olefin B can be introduced into the lower four fluidized-bed polymerization zones. It is also within the scope of the invention to introduce olefin A into more than one of the fluidized-bed polymerization zones, replacing olefin B in such one or more of the lower polymerization zones. Additionally, a third olefin could be introduced into one or more of the intermediate polymerization zones.

Block copolymers can also be produced by the fluidized-bed polymerization system described in the drawing by the introduction of olefin A in the top zone, olefin B in the lowest zone, and an inert gas in one or more of the intermediate zones. The effect of this polymerization method would be to reduce the tendency of the monomers to produce a random copolymer and substantially improve the possibility of producing an ideal A–B block copolymer. Operating in this manner would permit exhaustion of olefin B in the gaseous stream passing upwardly through reactor 10 before reaching the top zone so that mixing of the two monomers would be avoided.

As previously described, operation of the fluidized-bed reactor permits temperature control in each of the fluidized-bed polymerization zones. This enables the employment of a higher polymerization temperature in the lower fluidized-bed polymerization zone with the temperature maintained so that the block copolymer particles begin to fuse together and agglomerate. Thus, without sacrifice of reaction rate or danger of fouling in the upper stages, the block copolymer product can be obtained as relatively large aggregates which eliminates the necessity for a pelletizing step conventionally employed in block copolymerization processes.

In addition to the olefin monomer, the feed streams to each of the fluidized-bed polymerization zones can contain inert gaseous constituents or gaseous reaction modifiers such as hydrogen. For example, by varying the hydrogen concentration in each of the fluidized-bed polymerization zones, polymers of varying molecular weight distribution can be obtained.

The following example is presented to illustrate objects and advantages of the invention. It is not intended, however, to limit the invention to the specific embodiments presented therein.

EXAMPLE

A gaseous stream comprising 50 volume percent ethylene with the remainder consisting of methane is passed to the top zone of the five-zone fluidized-bed reactor illustrated in the drawing at the rate of 600 liters per hour. The temperature of the gaseous stream passed to the top fluidized-bed zone is 30° C. Gaseous feed streams comprising 50 volume percent propylene and 50 volume percent methane are passed to each of the next four lower fluidized-bed zones at the rate of 400 liters per hour, 500 liters per hour, 600 liters per hour and 6500 liters per hour, respectively, the highest gaseous rate being passed to the lowest fluidized-bed zone. The temperature of the propylene-containing stream passed to each of the four fluidized-bed zones is 60° C.

The cross-sectional area of each fluidized bed is 200 square inches and the volume of each fluidized bed is 2.0 liters. The total residence time for the monomer introduced into the fluidized-bed reactor is one hour. A fluidized bed temperature of 60° C. is maintained in the top fluidized zone and a temperature of 75° C. is maintained in the next four lower fluidized zones. A substantially constant pressure of 75 p.s.i. is maintained in the fluidized-bed reactor.

A catalyst composition comprising titanium trichloride and triethylaluminum in a hexane diluent is passed at the rate of 2 grams per hour to the top fluidized-bed zone. The weight ratio of triethylaluminum to titanium trichloride is 2:1. For purposes of transmitting the catalyst to the fluidized-bed reactor, the catalyst can be placed in an inert diluent such as hexane and sprayed into the reactor as shown in this example, or it can be transmitted to the reactor in solid form by employing a carrier such as a polymer product of the polymerization reaction.

An ethylene-propylene block copolymer comprising 10 mol percent ethylene and 90 mol percent propylene is withdrawn from the bottom fluidized-bed zone at the rate of 5,000 grams per hour.

Although the invention has been described with reference to specific materials, embodiments and details, various modifications and changes, within the scope of the invention, will be apparent to those skilled in the art and are contemplated to be embraced in the invention.

What is claimed is:

1. In a vapor phase olefin polymerization process carried out in a reactor containing a plurality of interconnected vertically aligned polymerization zones, the bottommost zone containing a vertically adjustable pipe to withdraw solids from the reactor, each of the remaining zones containing a vertically adjustable solids overflow pipe providing communication to the next lower polymerization zone and controlling the effective depth of the solids bed in said polymerization zone and the residence time of solid particles in said polymerization zone, each of said polymerization zones having independent means for feeding gases to said zone, said polymerization being carried out under conditions wherein vaporous olefin feed is passed upwardly through the multiple polymerization zones in intimate contact with fluidized catalyst particles under polymerization temperature and pressure conditions, wherein solid catalyst particles are introduced into the topmost polymerization zone, wherein solids are passed downwardly through the multiple polymerization zones and wherein solid polymer particles are withdrawn from the bottommost polymerization zone; the improvements which consist essentially of, in combination,
   (a) feeding a first olefin into the uppermost polymerization zone,
   (b) feeding a second olefin into at least one of the lower polymerization zones,
   (c) independently controlling the residence time of the formed polymer particles in each of the polymerization zones, and
   (d) withdrawing polymer solids from the lowermost polymerization zone,
the second olefin being selected from the group consisting of ethylene, propylene, butene-1, butadiene, pentene-1, and 3-methylbutene, the first olefin being selected from the group consisting of ethylene, propylene, butene-1, butadiene, pentene-1, and 3-methylbutene, and being different from the second olefin, and having a higher polymerization rate than the second olefin.

2. The process of claim 1 to include feeding an inert gas to at least one polymerization zone intermediate those polymerization zones being fed the first and second olefins.

3. The process of claim 1 to include feeding the first olefin to the topmost and bottommost polymerization zones and feeding the second olefin to at least one intermediate polymerization zone.

4. The process of claim 1 to include maintaining the temperature in the bottommost polymerization zone at a higher level than maintained in the other polymerization zones.

5. The process of claim 1 to include maintaining a relatively uniform pressure throughout each of the polymerization zones.

6. The process of claim 1 wherein five polymerization zones are employed in adjacent vertical relationship.

7. The process of claim 6 wherein ethylene is introduced into the top polymerization zone and propylene is introduced into the lower four polymerization zones.

8. The process of claim 7 wherein the catalyst introduced into the top polymerization zone comprises a Ziegler-type catalyst.

9. The process of claim 8 wherein said Ziegler-type catalyst comprises titanium trichloride and triethylaluminum.

References Cited

UNITED STATES PATENTS

| | | | |
|---|---|---|---|
| 3,474,158 | 10/1969 | Scoggin | 260—878 B |
| 2,936,303 | 5/1960 | Goins | 260—94.9 P |
| 3,049,527 | 8/1962 | Powelson | 260—94.9 P |
| 3,454,675 | 7/1969 | Scoggin. | |

FOREIGN PATENTS

| | | | |
|---|---|---|---|
| 1,006,469 | 10/1965 | Great Britain | 260—878 B |
| 1,032,945 | 6/1966 | Great Britain | 260—878 B |
| 1,045,221 | 10/1966 | Great Britain | 260—878 B |

JOSEPH L. SCHOFER, Primary Examiner

A. HOLLER, Assistant Examiner

U.S. Cl. X.R.

260—879